United States Patent
Chu

(10) Patent No.: US 9,967,000 B2
(45) Date of Patent: May 8, 2018

(54) METHOD OF ACQUIRING OPERATION STATE INFORMATION OF WIRELESS POWER SYSTEM

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 300 days.

(21) Appl. No.: 14/680,077

(22) Filed: Apr. 7, 2015

(65) Prior Publication Data

US 2015/0288423 A1 Oct. 8, 2015

Related U.S. Application Data

(60) Provisional application No. 61/977,059, filed on Apr. 8, 2014.

(51) Int. Cl.
| | |
|---|---|
| *H01F 27/42* | (2006.01) |
| *H01F 37/00* | (2006.01) |
| *H01F 38/00* | (2006.01) |
| *H04B 5/00* | (2006.01) |
| *H02J 5/00* | (2016.01) |
| *H02J 50/40* | (2016.01) |
| *H02J 50/80* | (2016.01) |
| *H02J 7/02* | (2016.01) |
| *H04W 52/02* | (2009.01) |

(Continued)

(52) U.S. Cl.
CPC .......... *H04B 5/0037* (2013.01); *H02J 5/005* (2013.01); *H02J 7/025* (2013.01); *H02J 13/0079* (2013.01); *H02J 50/10* (2016.02); *H02J 50/40* (2016.02); *H02J 50/80* (2016.02); *H04W 52/0229* (2013.01); *H04W 52/0261* (2013.01)

(58) Field of Classification Search
CPC .................................................... H04B 5/0037
USPC .......................................................... 307/104
See application file for complete search history.

(56) References Cited

U.S. PATENT DOCUMENTS

| | | | | |
|---|---|---|---|---|
| 9,190,849 B2* | 11/2015 | Won | ........................ | G06Q 30/06 |
| 2003/0200285 A1* | 10/2003 | Hansen | ............... | H04L 41/0806 |
| | | | | 709/220 |

(Continued)

FOREIGN PATENT DOCUMENTS

| | | |
|---|---|---|
| CN | 102130472 A | 7/2011 |
| CN | 102792552 A | 11/2012 |

(Continued)

OTHER PUBLICATIONS

European Search report dated Jul. 3, 2015 for EP application No. 15162743.7.

(Continued)

*Primary Examiner* — Lincoln Donovan
*Assistant Examiner* — Metasebia Retebo
(74) *Attorney, Agent, or Firm* — Winston Hsu

(57) ABSTRACT

A method for a mobile device in a wireless power system includes transmitting a request to a server of the wireless power system for acquiring operation state information of a first wireless power spot in the wireless power system, wherein the request at least comprises a required power threshold; and receiving a response comprising the operation state information of the first wireless power spot, wherein the operation state information at least comprises a capacity and an availability of the first wireless power spot.

7 Claims, 9 Drawing Sheets

(51) Int. Cl.
*H02J 13/00* (2006.01)
*H02J 50/10* (2016.01)

(56) References Cited

U.S. PATENT DOCUMENTS

| | | | |
|---|---|---|---|
| 2008/0122297 | A1 | 5/2008 | Arai |
| 2011/0221391 | A1* | 9/2011 | Won ............ H01M 10/44 320/108 |
| 2012/0268238 | A1 | 10/2012 | Park |
| 2013/0091225 | A1 | 4/2013 | Eaton |
| 2013/0262856 | A1 | 10/2013 | Moshfeghi |

FOREIGN PATENT DOCUMENTS

| | | |
|---|---|---|
| CN | 102812618 A | 12/2012 |
| CN | 102832670 A | 12/2012 |
| CN | 103094965 A | 5/2013 |
| EP | 2 533 401 A1 | 12/2012 |
| TW | 201136087 A1 | 10/2011 |
| TW | 201138256 A1 | 11/2011 |
| WO | 2011112022 A2 | 9/2011 |
| WO | 2011112022 A3 | 9/2011 |

OTHER PUBLICATIONS

PMA Wireless Power Transfer (WPT) Network Specification—Network Architecture Model, Mar. 23, 2014.

PMA Host Control Interface Specification—System Release 1, Feb. 21, 2014.

PMA Wireless Power Transfer (WPT) Network Specification—PMA Receiver Operating System (OS) Application Programming Interface (API) Primitives, Mar. 23, 2014.

PMA Wireless Power Transfer (WPT) Network Specification—PMA Cloud Service (PCS)/Transmitter Gateway (T-GW) Interface Description and Application Programming Interface (API), Mar. 17, 2014.

PMA Wireless Power Transfer (WPT) Network Specification—PMA Cloud Service (PCS)/User Control Function (UCF) Interface Description and Application Programming Interface (API), Mar. 23, 2014.

European Search report dated Oct. 1, 2015 for EP application No. 15162743.7.

Office action dated Oct. 15, 2015 for the European application No. 15162743.7, p. 1-10.

* cited by examiner

METHOD OF ACQUIRING OPERATION STATE INFORMATION OF WIRELESS POWER SYSTEM

CROSS REFERENCE TO RELATED APPLICATIONS

This application claims the benefit of U.S. Provisional Application No. 61/977,059, filed on Apr. 8, 2014, the contents of which are incorporated herein in their entirety.

BACKGROUND OF THE INVENTION

1. Field of the Invention

The present invention relates to a method for a wireless power system, and more particularly, to a method of acquiring operation state information of the spots providing the wireless charging service in a wireless power system.

2. Description of the Prior Art

With the proliferation of portable electronic devices such as mobile device (MD), smart phone and tablet PC, the demand for charging devices, especially for those provided in public areas, is increasing. In addition, people would like to get rid of annoying wires if possible. One technology which realizes this desire is wireless charging, in which portable electronic device(s) comprising a wireless power receiver is placed on and charged through a wireless power base station (e.g. a power base station comprising a wireless power transmitter).

When running out of the battery of the portable electronic devices, the user desires acknowledging the information of nearby spots which provide the wireless charging services. However, the user may run into an awful experience if the wireless power base stations of the nearby spots have been occupied when the user arrives the nearby spot or if the wireless power provided by the wireless power base stations of the nearby spots is not sufficient for the wireless power required by the portable electronic devices. Thus, how to acquire sufficient operation state information of the spots providing the wireless charging service becomes a topic to be discussed.

SUMMARY OF THE INVENTION

In order to solve the above problems, the present invention provides methods for acquiring information of the spots providing the wireless charging service in a wireless power system.

The present invention discloses a method for a mobile device in a wireless power system. The method comprises transmitting a request to a server of the wireless power system for acquiring operation state information of a first wireless power spot in the wireless power system, wherein the request at least comprises a required power threshold; and receiving a response comprising the operation state information of the first wireless power spot, wherein the operation state information at least comprises a capacity and an availability of the first wireless power spot.

The present invention further discloses a method for a server in a wireless power system. The method comprises receiving a plurality of reports from a first plurality of wireless power spots in the wireless power system; receiving a first request from a mobile device in the wireless power system for acquiring operation state information of a second wireless power spot in the wireless power system; selecting the second wireless power spot from the first plurality of wireless power spots according to the first request; and transmitting a response to the mobile device, to indicate the operation state information of the second wireless power spot; wherein each of the plurality of reports comprises a first capacity and a first availability of each of the first plurality of wireless power spots; wherein the first request at least comprises a required power threshold; wherein the operation state information comprises a second capacity and a second availability of the second wireless power spot.

The present invention further discloses a method of a wireless power spot in a wireless power system. The method comprises transmitting a report to a server of the wireless power system; wherein the report comprises a capacity and an availability of the wireless power spot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
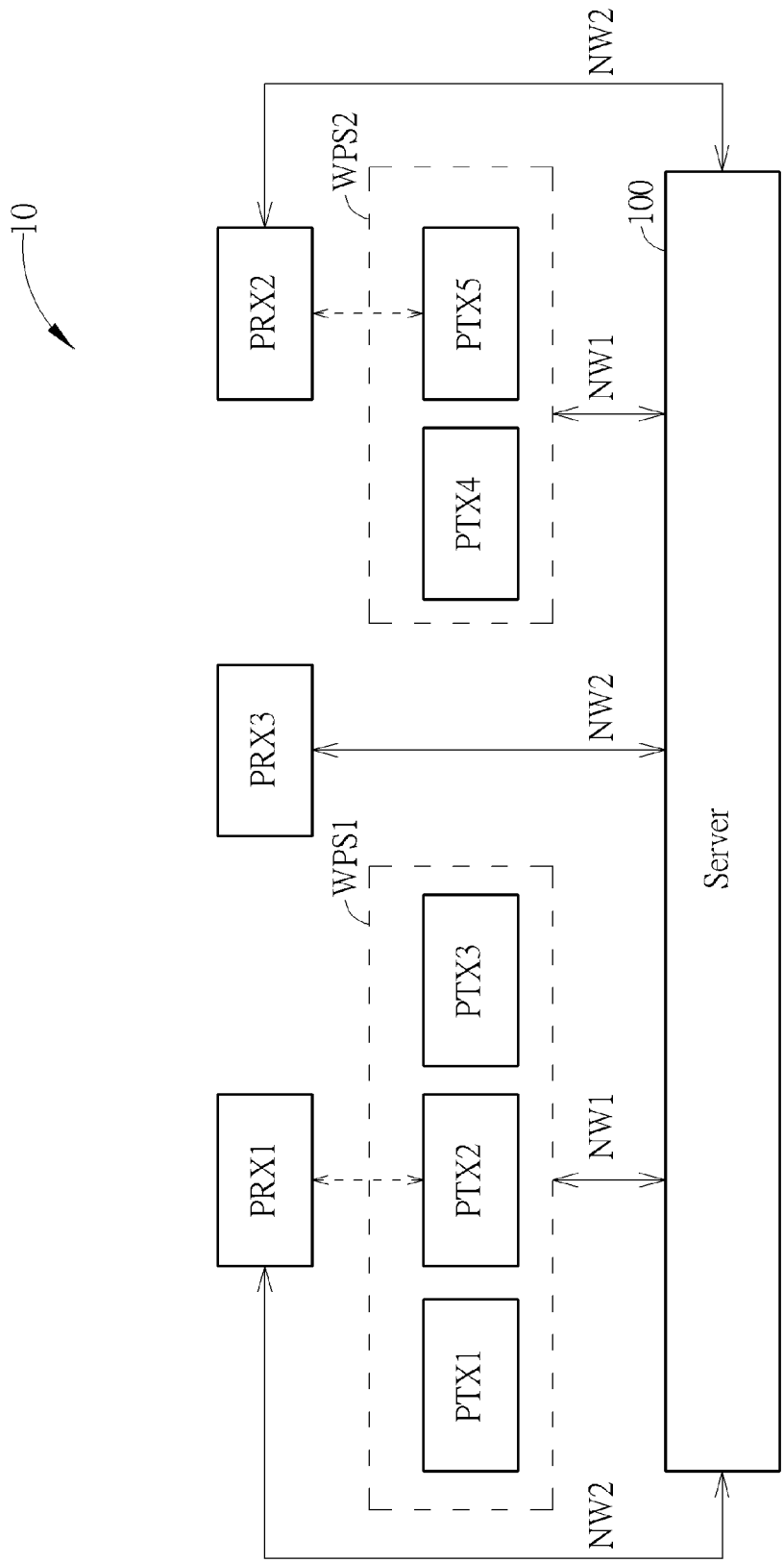
FIG. 1 is a schematic diagram of a wireless power system according to an example of the present invention.

Please refer to FIG. 1, which is a wireless power system 10 according to an example of the present invention. A wireless power system may include a plurality of mobile devices PRX and at least one wireless power spot for providing wireless charging service to the mobile devices. In FIG. 1, the wireless power system is briefly composed of a server 100, wireless power spots WPS1, WPS2 and mobile devices PRX1-PRX3. The wireless power spots WPS1 and WPS2 may be set in different places (e.g. coffee shops, convenient stores, train stations and subway stations), and each comprises at least one wireless power base station which is able to provide wireless power to one or more of the mobile devices. In this example, the wireless power spot WPS1 comprises 3 wireless power base stations PTX1-PTX3 and the wireless power spot WPS2 comprises 2 wireless power base stations PTX4 and PTX5.

Each of the wireless power base stations PTX1-PTX5 may include a wireless power transmitter or a wireless power transmitting module with digital/analog chip(s), to supply wireless power to the mobile devices. In this example, the mobile device PRX1 is charged by the wireless power base station PTX2 (denoted with a blank arrow) of the wireless power spot WPS1, and the mobile device PRX2 is charged by the wireless power base station PTX5 of the wireless power spot WPS2. Each of the mobile devices PRX1-PRX3 may be any portable mobile device such as a mobile device (MD), a mobile phone, a laptop, a tablet computer, an electronic book, a portable computer system, or at least one wireless power receiver or wireless power receiving module. Alternatively, each of the mobile devices PRX1-PRX3 may be any mobile device using battery as its power supply, such as a wearable computing device, a wearable medical device, a portable MP3 player, etc. When performing the wireless charging, the mobile devices PRX1-PRX3 may directly attach to the wireless power base stations PTX1-PTX5 or keep within a distance from the wireless power base station PTX1-PTX5. The mobile devices PTX1-PTX3 may receive wireless power from the wireless power base stations PTX1-PTX5 by electromagnetic induction so that the batteries of the mobile devices PRX1-PRX3 are charged without using any wire connection.

Note that, the connections NW1 between each of the wireless power spots WPS1, WPS2 and the server may be consisted of wire connections, e.g. Asymmetric Digital Subscriber Line (ADSL) and local area network (LAN)) and/or wireless connections (e.g. Bluetooth, Wi-Fi, Long Term Evolution (LTE), third generation of mobile telecommunications technology (3G) and Near Field Communication (NFC), and are not limited herein. In addition, the connections NW2 between each of the mobile devices PRX1-PRX3 and the server may be consisted of the wireless connections, and are not limited herein.

Figure 2A:
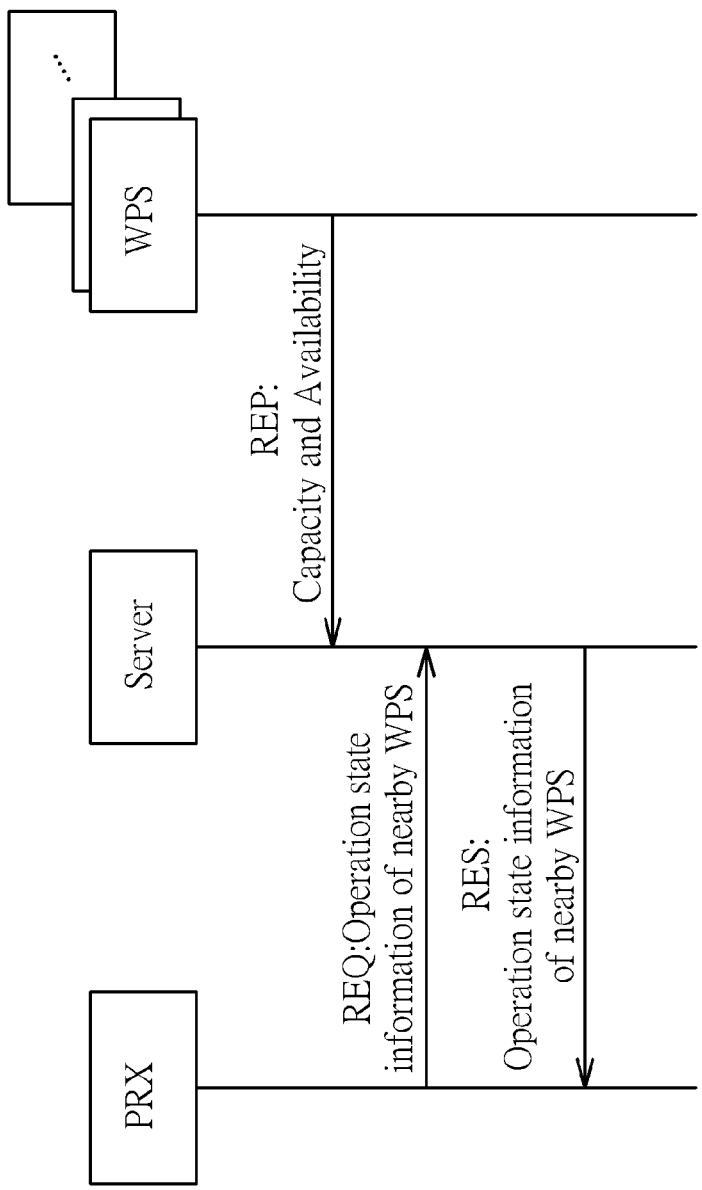
FIG. 2A is a schematic diagram of a message flow according to an example of the present invention.

Please refer to FIG. 2A, which illustrates a message flow in a wireless power system according to an example of the present invention. In this example, each of a plurality of wireless power spots WPS (e.g. the wireless power spots WPS1 and WPS2) transmits a report REP to a server (e.g. the server 100) for reporting its operation state information. For example, each of the plurality of wireless power spots WPS may periodically transmit the report REP to the server for updating the latest operation state information. The report REP may comprise the basis information of the wireless power base station, such as a location (e.g. latitude and longitude), the operation status (e.g. whether providing the wireless charging service), a spot name of the wireless power spot, the available supporting power of the wireless power base stations in the wireless power spot and a report time. The report REP may further comprise a capacity (e.g. a number of total wireless power base stations in the wireless power spot) of the wireless power spot and an availability (e.g. a number of the available wireless power base station) in the wireless power spot.

Note that, the available wireless power base station may be the power base stations which is not charging other mobile devices or the power base stations having available and sufficient wireless power while charging other mobile devices. In addition, the wireless power spot may report any information for deriving the capacity and the availability of the wireless power spot instead of reporting the capacity and the availability directly. For example, the report REP may comprise a total supporting power of the wireless power spot, the supporting power of each wireless power base station, and the currently available supporting power of the wireless power spot and the server derives the capacity and the availability of the wireless power spot according to the information provided in the report REP.

Next, the mobile device PRX transmits a request REQ to the server for acquiring the operation state information (e.g. the location, the capacity and the availability) of the nearby and available wireless power spot when the mobile device PRX (or other portable electronic devices) runs out of battery. The request REQ may comprise a location of the mobile device PRX, a required power threshold (i.e. the minimum power provided by the wireless power spot), a searching radius from the location of the mobile device PRX, and is not limited herein.

According to the request REQ from the mobile device PRX, the server selects the qualified wireless power spot WPS which satisfies the conditions specified in the request REQ from the plurality of wireless power spots WPS and accordingly transmits a response RES to the mobile device PRX. The response RES may comprise the operation state information of the qualified wireless power spots WPS, such as the location of the qualified wireless power spot WPS, the distance between the mobile device PRX and the qualified wireless power spot WPS, the capacity and the availability of the qualified power spot WPS. In an example, the capacity may be the number of the wireless base stations satisfy the conditions (e.g. the required power threshold) of the request REQ in the qualified wireless power spot WPS and the availability may be the number of the wireless base stations which satisfy the conditions (e.g. the required power threshold) of the request REQ and is available in the qualified wireless power spot WPS. In another example, the response RES may indicate that there is no qualified wireless power spot. The user of the mobile device PRX therefore may decide going to a wireless power spot for utilizing the wireless charging service or the user of the mobile device PRX may modify the searching criterions and transmit the request REQ again.

Note that, the response from the server to the mobile device PRX may comprise the information for deriving the capacity and the availability of the qualified wireless power spot (e.g. the total supporting power of the qualified wireless power spot and the currently available supporting power of the qualified wireless power spot).

As to an example of the message flow shown in FIG. 2A, please jointly refer to FIG. 1. First, the wireless power spots WPS1 and WPS2 transmit the reports REP to the server 100. In this example, the report REP of the wireless power spot WPS1 indicates the name N1 of the wireless power spot WPS1, the location L1 of the wireless power spot WPS1, the supporting powers of the wireless power base stations PTX1-PTX3 of 2 watts, the capacity of 3 and the availability of 2, and the report REP of the wireless power spot WPS2 indicates the name N2 of the wireless power spot WPS2, the location L2 of the wireless power spot WPS2, the supporting powers of the wireless power base stations PTX4, PTX5 of 1 watt, the capacity of 2 and the availability of 1.

Note that, the wireless power spots WPS1 and WPS2 may report the information for deriving the capacity and the availability of the wireless power spots WPS1 and WPS2. For example, the wireless power spot WPS1 may report the sum of the supporting powers of the wireless power base stations PTX1-PTX3 (i.e. 6 watts) as the total supporting power and the sum of the supporting powers of wireless power base stations PTX1 and PTX3 (i.e. 4 watts) as the available supporting powers. The server 100 therefore can derive the capacity and the availability of the wireless power spot WPS1 are 3 and 2, respectively, according to the total supporting power, the available supporting powers and the supporting powers of the wireless power base stations PTX1-PTX3.

Next, the mobile device PRX3 transmits the request REQ to the server 100 via the connection NW2, wherein the request REQ specifies the location L3 of the mobile device PRX3, the required power threshold of 2 watts, and the searching radius. Based on the request REG from the mobile device PRX3, the server 100 selects the qualified wireless power spot according to the reports from the wireless power spots WPS1 and WPS2. In this example, the wireless power base station PTX1-PTX3 of the wireless power spot WPS1 satisfies the required power threshold of the request REQ and the distance between the location L1 of the wireless power spot WPS1 and the location L3 is within the searching radius of the request REQ, thus the server 100 determines the wireless power spot WPS1 satisfies the conditions specified in the request REQ. The server 100 therefore transmits the response RES to the mobile device PRX3, to indicate the operation state information of the wireless power spot WPS1 such as the capacity, the availability, the location L1 of the wireless power spot WPS1 and the distance between the location L1 and the location L3 of the mobile deice PRX3.

Figure 2B:
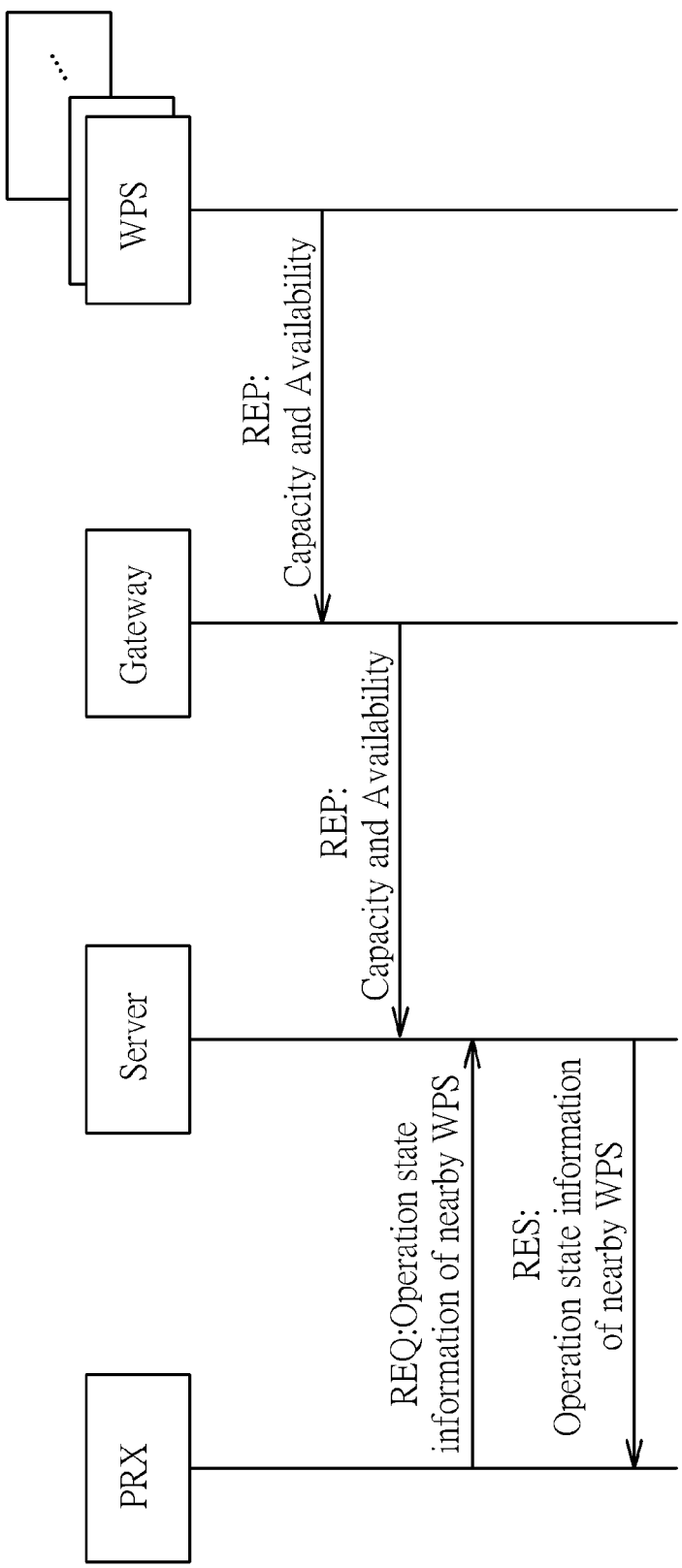
FIG. 2B is a schematic diagram of another message flow according to an example of the present invention.

In an example, each of the plurality of wireless power spots WPS may transmit the report REP via a gateway. Please refer to FIG. 2B, which illustrates a schematic diagram of another message flow according to an example of the present invention. In FIG. 2B, the wireless power spots WPS may transmits the reports REP to the gateway and the gateway transmits the reports REP to the server. For example, the gateway may aggregate the reports REP from the plurality of wireless power spots WPS and simultaneously transmits the reports REP to the server. When the mobile device PRX transmits the request to the server for the operation state information of the nearby and available wireless power spot WPS, the server selects the qualified wireless power spot WPS which satisfies the conditions (e.g. meet the required wireless power and being within the searching radius) of the request REQ and transmits the response RES to the mobile device PRX to indicate the operation state information of the qualified wireless power spot WPS.

In an example, the server may acquire the reports REP from the plurality of wireless power spots WPS after receiving the request REQ from the mobile device PRX. Please refer to FIG. 3A, which is a schematic diagram of a message flow according to an example of the present invention. In this example, the mobile device PRX first transmits the request REQ1 for acquiring the operation state information of the nearby and available wireless power spot WPS. After receiving the request REQ1 from the mobile device PRX, the server transmits a request REQ2 to each of the plurality of wireless power spots WPS in the wireless power system, for acquiring the reports REP from the plurality of wireless power spots WPS. The server therefore can acquire the latest operation state information of the plurality of wireless power spots WPS, select the qualified wireless power spot WPS which satisfies the conditions of the request REQ1, and accordingly transmit the response REP to the mobile device PRX, to inform the mobile device PRX about the operation state information of the qualified wireless power spot WPS.

Figure 3A:
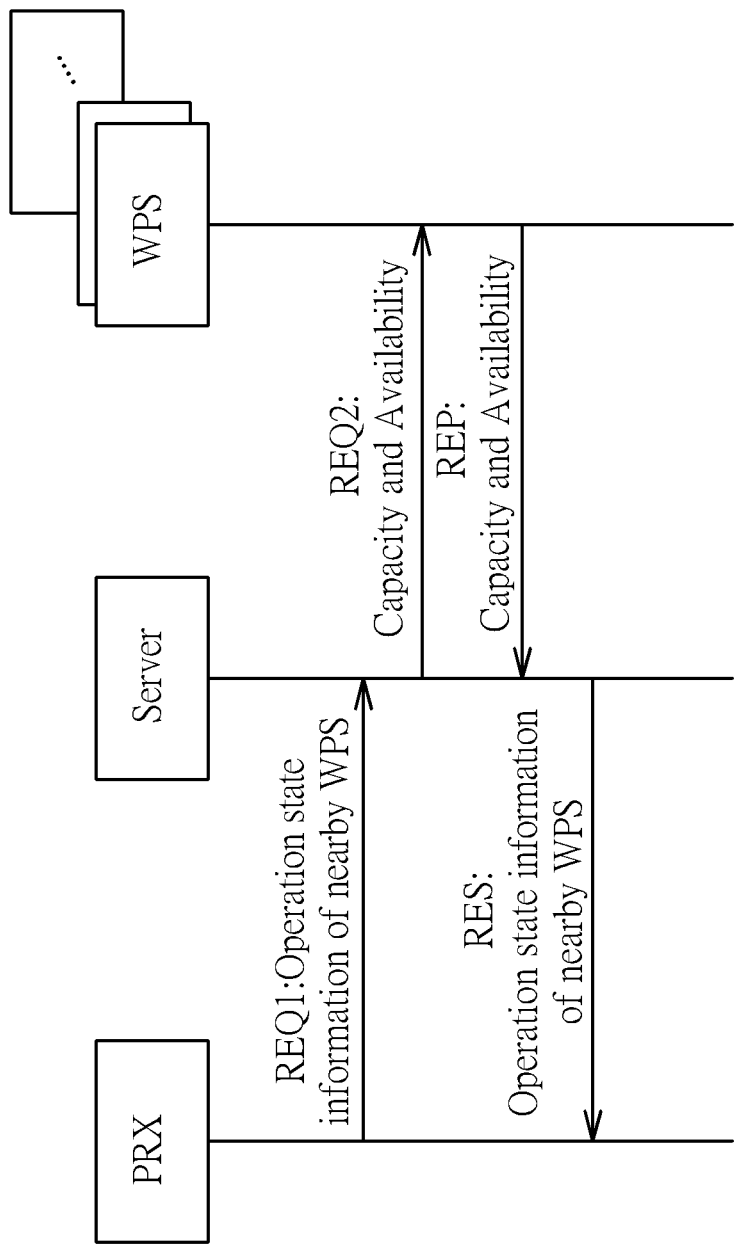
FIG. 3A is a schematic diagram of another message flow according to an example of the present invention.

As to an example of the message flow shown in FIG. 3A, please back to FIG. 1. When the mobile device PRX3 runs out of battery, the mobile device PRX3 transmits the request REQ1 to the server 100 via the connection NW2, wherein the request REQ1 specifies the location L3 of the mobile device PRX3, the required power threshold of 1 watt, and the searching radius. After receiving the request REQ1, the server 100 transmits the request REQ2 to the wireless power spots WPS1 and WPS2 for acquiring the reports REP. The report REP of the wireless power spot WPS1 indicates the name N1 of the wireless power spot WPS1, the location L1 of the wireless power spot WPS1, the supporting powers of the wireless power base stations PTX1-PTX3 of 2 watts, the capacity of 3 and the availability of 2, and the report REP of the wireless power spot WPS2 indicates the name N2 of the wireless power spot WPS2, the location L2 of the wireless power spot WPS2, the supporting powers of the wireless power base stations PTX4, PTX5 of 1 watt, the capacity of 2 and the availability of 1.

Based on the request REQ1 from the mobile device PRX3, the server 100 selects the qualified wireless power spot according to the reports REP from the wireless power spots WPS1 and WPS2 and determines both of the wireless power spots WPS1 and WPS2 satisfy the conditions specified in the request REQ1. The server 100 therefore transmits the response RES to the mobile device PRX3, to indicate the operation state information of the wireless power spots WPS1 and WPS2.

Figure 3B:
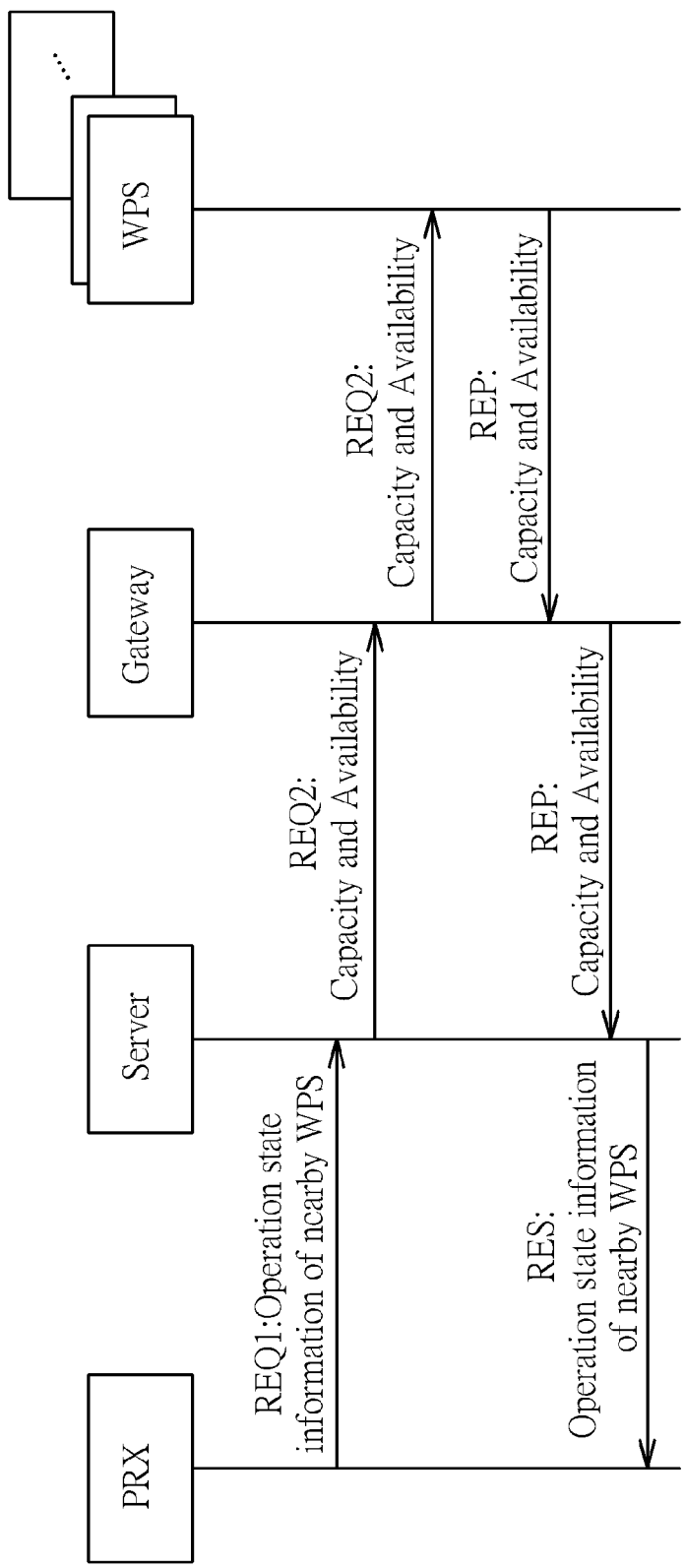
FIG. 3B is a schematic diagram of another message flow according to an example of the present invention.

Please refer to FIG. 3B, which illustrates a schematic diagram of a message flow according to an example of the present invention. Different from the FIG. 3A, the server communicates with the plurality of wireless power spots via a gateway. In this example, the server transmits the request REQ2 to the gateway after receiving the request REG1 from the mobile device PRX. Next, the gateway transmits the request REQ2 to each of the plurality of wireless power spots WPS and transfers the reports REP from the plurality of wireless power spots WPS to the server. The server therefore can select the qualified wireless power spot according to the request REQ1 and accordingly transmit the response RES to the mobile device PRX, to inform the mobile device PRX the operation state information of the qualified wireless power spot.

According to different applications and design concepts, those with ordinary skill in the art may observe appropriate alternations and modifications. For example, the gateway may periodically receive the reports REP from the plurality of wireless power spots WPS and transmits the reports REP to the server when receiving the corresponded request REQ2 in FIG. 3B.

Note that, the connections between the gateway and the server, may be consisted of wire connections (e.g. ADSL and LAN) and/or wireless connections (e.g. Bluetooth, Wi-Fi, LTE, 3G and NFC), and are not limited herein.

Figure 4:
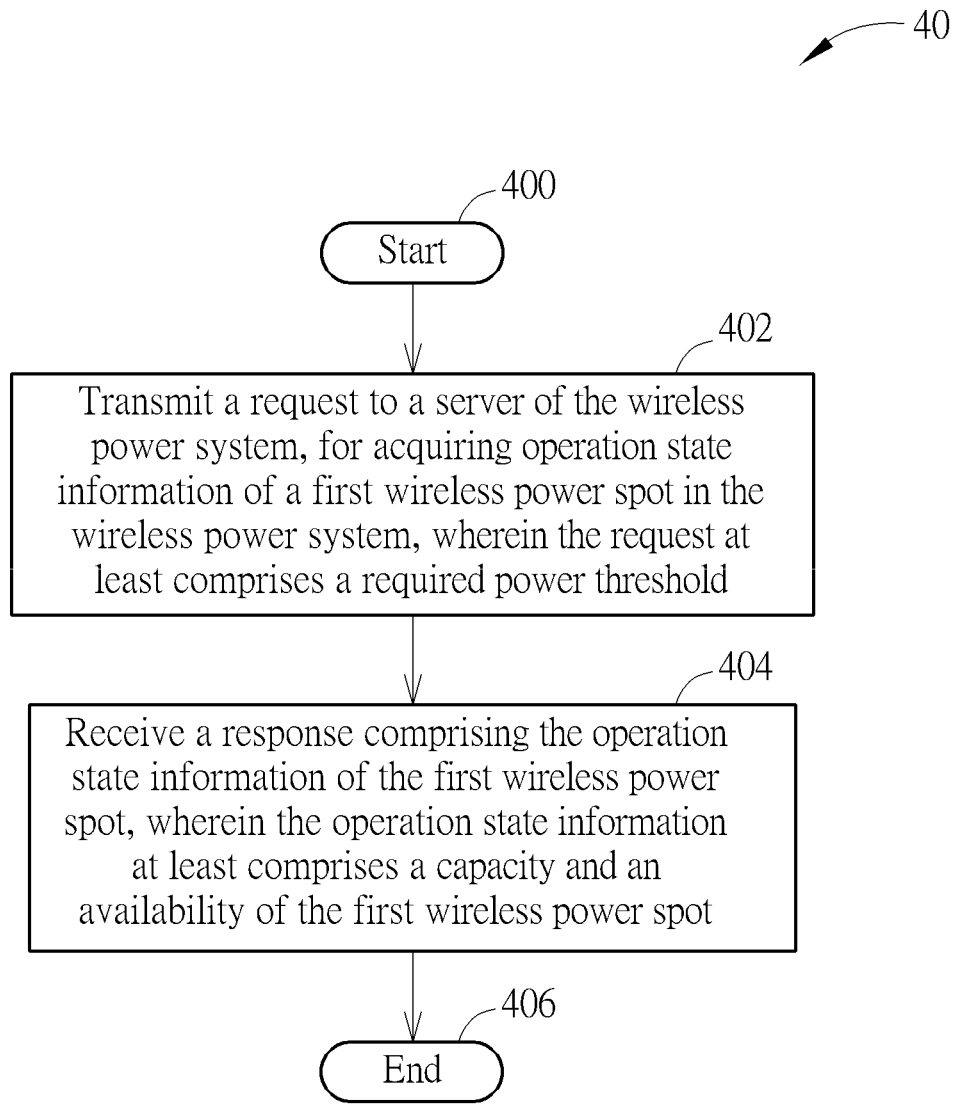
FIG. 4 is a flowchart of a process according to an example of the present invention.

The process of the mobile device PRX transmitting the request REQ for acquiring the operation state information of the nearby and available wireless power spot WPS in the above examples can be summarized into a process 40 shown in FIG. 4. The process 40 is utilized in a mobile device of a wireless power system and comprises the following steps:

Step 400: Start.

Step 402: Transmit a request to a server of the wireless power system, for acquiring operation state information of a first wireless power spot in the wireless power system, wherein the request at least comprises a required power threshold.

Step 404: Receive a response comprising the operation state information of the first wireless power spot, wherein the operation state information at least comprises a capacity and an availability of the first wireless power spot.

Step 406: End.

According to the process 40, the mobile device transmits a request to the server, for acquiring operation state information of a first wireless power spot in the wireless power system. Note that, the first wireless power spot represents for the wireless power spot which is nearby to the mobile device and is available to provide the wireless power to the mobile device, and is not limited to be a specific wireless power spot. The request comprises the basic information of the mobile device (e.g. the location) and the conditions of selecting the first wireless power spot (e.g. the searching radius, the required power threshold). After receiving the request, the server selects the first wireless power spot according to the request and transmits the response to the mobile device to indicate the operation state information of the first wireless power spot. For example, the response from the server comprises the name, the location, the capacity, the availability of the first wireless power spot and the distance between the mobile device and the first wireless power spot. The user of the mobile device therefore can decide going to which wireless power spot for utilizing the wireless charging service. The detailed operations of the process 40 can be referred to the above, and are not narrated herein for brevity.

Figure 5:
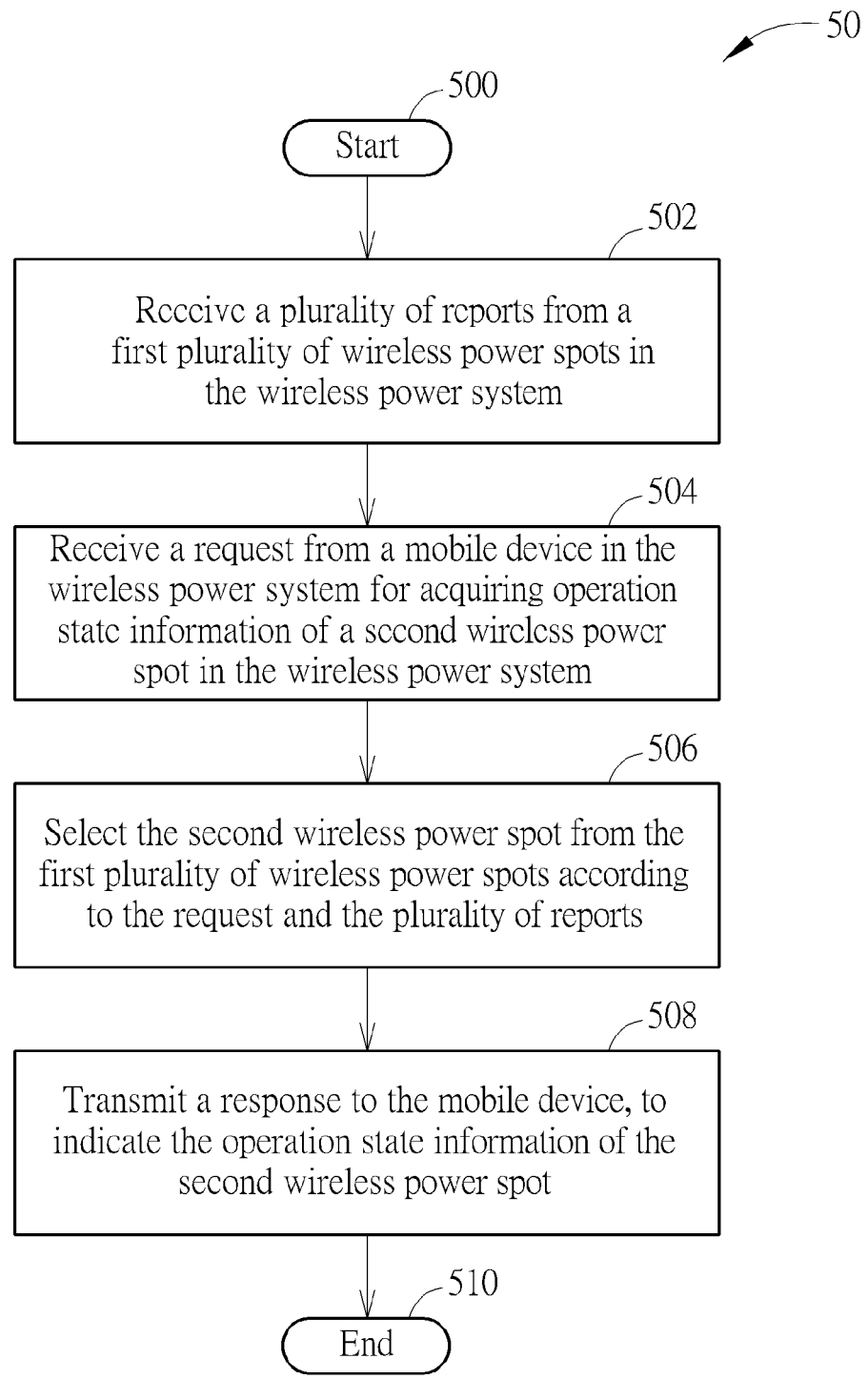
FIG. 5 is a flowchart of another process according to an example of the present invention.

The process of the server receiving the reports REP from each of plurality of wireless power spots WPS and the request for acquiring the information of the nearby and available wireless power spot in the above examples can be summarized into a process 50 shown in FIG. 5. The process 50 is utilized in a server of a wireless power system and comprises the following steps:

Step 500: Start.

Step 502: Receive a plurality of reports from a first plurality of wireless power spots in the wireless power system.

Step 504: Receive a request from a mobile device in the wireless power system for acquiring operation state information of a second wireless power spot in the wireless power system.

Step 506: Select the second wireless power spot from the first plurality of wireless power spots according to the request and the plurality of reports.

Step 508: Transmit a response to the mobile device, to indicate the operation state information of the second wireless power spot.

Step 510: End.

According to the process 50, the server of the wireless power system receives a plurality of reports from a first plurality of wireless power spots for acquiring the operation state information (e.g. the operation status, the location, the capacity and the availability) of the first plurality of wireless power spot. In an example, each of the first plurality of wireless power spots periodically transmits the report to the server, for updating the operation state information. In another example, each of the first plurality of wireless power spots transmits the report to the server via a gateway of the wireless power system. Next, the mobile device transmits a first request for the operation state information of a second wireless power spot to the server, wherein second wireless power spot is the wireless power spot which is nearby to the mobile device and is available to provide the wireless power to the mobile device, and is not limited to be a specific wireless power spot. When receiving the request from a mobile device, the server searches the first wireless power spots according to the conditions specified in the request, to select the second wireless power spot and accordingly transmit a response to the mobile device. The response may comprise the name, the location, the capacity, the availability of the second wireless power spot and the distance between the mobile device and the second wireless power spot. The detailed operations of the process 50 can be referred to the above, and are not narrated herein for brevity.

Figure 6:
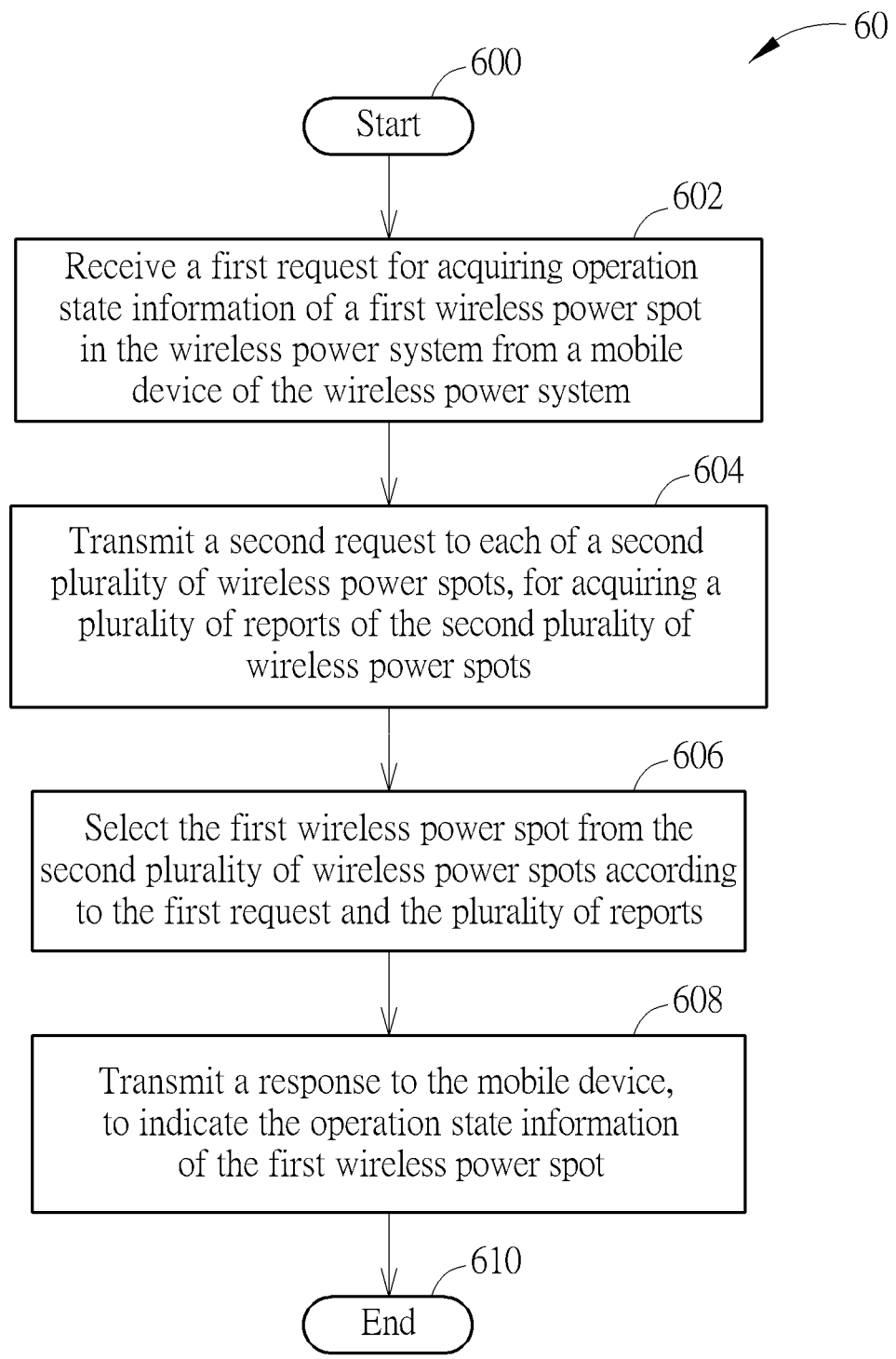
FIG. 6 is a flowchart of another process according to an example of the present invention.

The process of the server requiring reports REP from each of plurality of wireless power spots WPS after receiving the request REQ1 for acquiring the operation state information of the nearby and available wireless power spot WPS in the above examples can be summarized into a process 60 shown in FIG. 6. The process 60 is utilized in a server of a wireless power system and comprises the following steps:

Step 600: Start.

Step 602: Receive a first request for acquiring operation state information of a first wireless power spot in the wireless power system from a mobile device of the wireless power system.

Step 604: Transmit a second request to each of a second plurality of wireless power spots, for acquiring a plurality of reports of the second plurality of wireless power spots.

Step 606: Select the first wireless power spot from the second plurality of wireless power spots according to the first request and the plurality of reports.

Step 608: Transmit a response to the mobile device, to indicate the operation state information of the first wireless power spot.

Step 610: End.

According to the process 60, the server receives a first request from a mobile device when the mobile device requires acknowledging the operation state information of a first wireless power spot. Note that, the first wireless power spot is not a specific wireless power spot and is the wireless power spot being nearby to the mobile device and available to provide the wireless power to the mobile device. After receiving the first request, the server transmits a second request to each of a second plurality of wireless power spots to acquire reports about the latest operation state information of each of the second plurality of wireless power spots. In an example, the server may communicate with the second plurality of wireless power spots via a gateway of the wireless power system. Next, the server selects the first wireless power spot from the second plurality of wireless power spots according to the first request and accordingly transmits a response to the mobile device. The response may comprise the name, the location, the capacity, the availability of the first wireless power spot and the distance between the mobile device and the first wireless power spot. The detailed operations of the process 60 can be referred to the above, and are not narrated herein for brevity.

Figure 7:
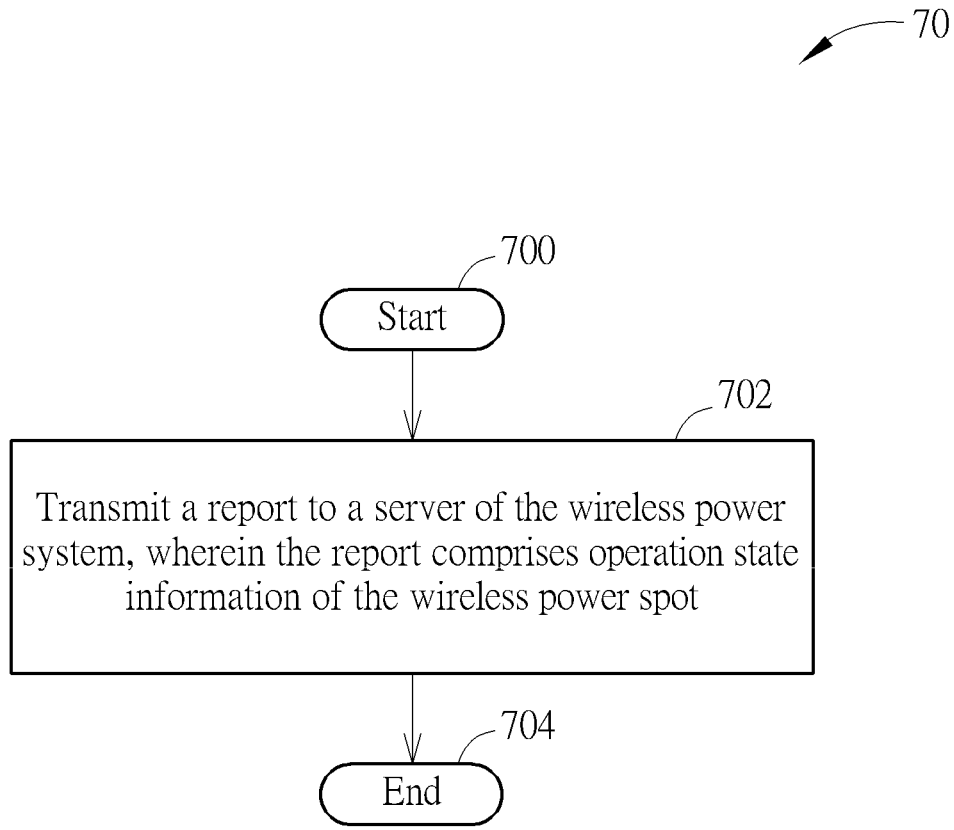
FIG. 7 is a flowchart of another process according to an example of the present invention.

The process of the wireless power spot WPS transmitting report REP to the server in the above examples can be summarized into a process 70 shown in FIG. 7. The process 70 is utilized in a wireless power spot of a wireless power system and comprises the following steps:

Step 700: Start.

Step 702: Transmit a report to a server of the wireless power system, wherein the report comprises operation state information of the wireless power spot.

Step 704: End.

According to the process 70, the wireless power spot transmits a report to the server, to update operation state information of the wireless power spot. The operation state information may comprise a capacity and an availability of the wireless power spot. In an example, the capacity is a number of total wireless power base stations in the wireless power spot and the availability is a number of the available wireless power base station. In another example, the capacity is a total supporting power provided by the wireless power spot and the availability is an available supporting power provided by the wireless power spot. The detailed operations of the process 70 can be referred to the above, and are not described herein for brevity.

Note that, the timing of the wireless power spot transmitting the report to the server may be altered according different applications and design concepts. In an example, the wireless power spot transmits the report every specific period. In another example, the wireless power spot transmits the report when receiving a request (e.g. request REQ2) for updating the operation state information. In still another example, the wireless power spot transmits the report to the server via a gateway. Furthermore, the wireless power spot may communicate with the server via a gateway of the wireless power system.

Please note that, the above mentioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), and computer on module (COM).

To sum up, the methods of the above examples allow the wireless power spots to inform the server of the operation state information related to its capacity and availability and provide means for the mobile device to request the operation state information of the qualified and nearby wireless power spot.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a mobile device in a wireless power system, the method comprising:
    transmitting a request to a server of the wireless power system for acquiring operation state information of a first wireless power spot in the wireless power system, wherein the request at least comprises a required power threshold; and
    receiving a response comprising the operation state information of the first wireless power spot, wherein the operation state information at least comprises a capacity and an availability of the first wireless power spot;
    wherein the capacity is a number of wireless power base stations satisfying the required power threshold of the request in the first wireless power spot, and the availability is a number of available wireless power base stations satisfying the required power threshold in the first wireless power spot.

2. A method for a server in a wireless power system, the method comprising:
    receiving a plurality of reports from a first plurality of wireless power spots in the wireless power system;
    receiving a first request from a mobile device in the wireless power system for acquiring operation state information of a second wireless power spot in the wireless power system; selecting the second wireless power spot from the first plurality of wireless power spots according to the first request; and
    transmitting a response to the mobile device, to indicate the operation state information of the second wireless power spot;
    wherein each of the plurality of reports comprises a first capacity and a first availability of each of the first plurality of wireless power spots;
    wherein the first request at least comprises a required power threshold;
    wherein the operation state information comprises a second capacity and a second availability of the second wireless power spot;
    wherein the first capacity is a total supporting power provided by each of the first plurality of wireless power spots and the first availability is an available supporting power provided by each of the first plurality of wireless power spots.

3. The method of claim 2, wherein the second capacity is a number of the wireless power base stations satisfying the required power threshold in the second wireless power spot, and the second availability is a number of the available wireless power base stations satisfying the required power threshold in the second wireless power spot.

4. The method of claim 2, wherein the server periodically receives the plurality of reports.

5. The method of claim 2, wherein the server transmits a second request to the first plurality of wireless power spots after receiving the first request from the mobile device, to acquire the plurality of reports.

6. The method of claim 5, wherein the server transmits the second request to the first plurality of wireless power spots via a gateway of the wireless power system.

7. The method of claim 2, wherein the server receives the plurality of reports via a gateway of the wireless power system.

* * * * *